UNITED STATES PATENT OFFICE.

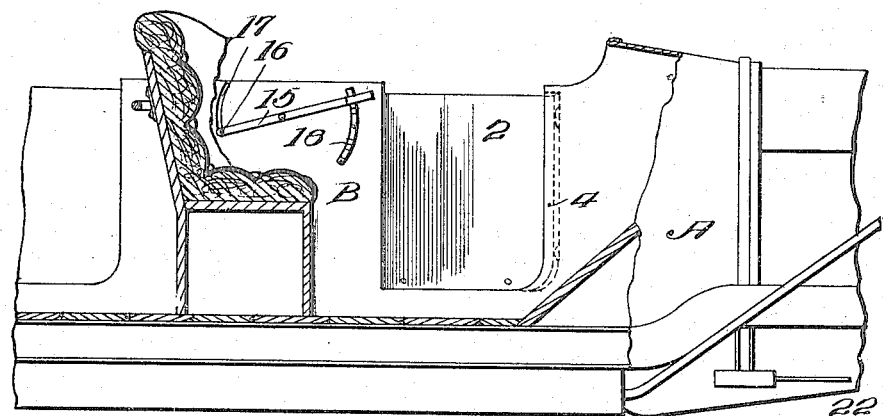

JACOB M. BOWER, OF DURHAM, NORTH CAROLINA.

SLIDING DOOR FOR AUTOMOBILES.

1,131,322. Specification of Letters Patent. Patented Mar. 9, 1915.

Application filed April 15, 1913. Serial No. 761,404.

*To all whom it may concern:*

Be it known that I, JACOB M. BOWER, citizen of the United States, residing at Durham, in the county of Durham and State of North Carolina, have invented certain new and useful Improvements in Sliding Doors for Automobiles, of which the following is a specification.

My invention relates to automobile doors and particularly to sliding doors for automobiles and to the actuating mechanism thereof.

The primary object of my invention is the provision of a simple, effective and compact mechanism whereby the sliding doors of automobiles may be actuated.

A further object of the invention is to provide means convenient to the hands of the driver whereby the door may be shifted into or out of a space formed in the side wall of the vehicle and locked either in a retracted or a projected position.

A further object of the invention is to provide means in connection with the sliding door for preventing rattling of the door when it is either projected or retracted.

A still further object is to provide means for shiftably supporting the door to permit it to run easily.

Other objects will appear in the course of the following description.

My invention is illustrated in the accompanying drawings wherein:

Figure 1 is a fragmentary view of the body of an automobile and showing the door in a projected position closing exit therefrom. Fig. 2 is an enlarged side elevation partly broken away showing the door and the actuating mechanism therefor. Fig. 3 is a fragmentary section on the line 3—3 of Fig. 2 showing the means for supporting the door.

Corresponding and like parts are referred to in the following description and indicated in all the views of the accompanying drawings by the same reference characters.

While I have illustrated my invention as applied to the fore door of an automobile, I wish it also understood that it might be applied to the rear doors thereof and that I have merely illustrated the fore door for convenience.

For many reasons it is advisable to provide fore doors to automobiles, and in recent years they have come into general demand. The fore doors as ordinarily used are hinged to the automobile and are not only inconvenient to open and close by the driver or by the occupant of the machine, but when released they have a tendency to swing out and as a consequence unless it is noticed that the door has swung out an accident is very liable to happen. Further the swinging out of the door is liable to wrench the hinges of the door if the door meets with an obstruction. Again, with a hinged fore door the door must always be closed. Under certain circumstances of running, it is much pleasanter to have the fore door open but this is impossible with a hinged fore door. By my invention I provide a door for automobiles which is not hinged but which is slidingly mounted and which when retracted is contained within the side wall of the body. By providing a door of this character, the door may be retracted in such position that it is not effective as a door, thus permitting running with the door open, or the door may be readily closed and automatically held in a closed position.

In the drawings, A designates an automobile of any ordinary description and B designates one side wall thereof. The side wall B is hollow, and slidingly mounted in tracks within this hollow side wall B is a door 2. As illustrated in Fig. 3, this door may be hollow and formed of sheet metal and the lower portion of the door carries within it the longitudinally alined rollers 3. Disposed within the lower portion of the side wall and extending longitudinally therealong below the door opening 4 is a track 5 having a laterally flanged tread face 6. The side plates 7 of the door 2 are inwardly turned and engage beneath the head of this flange. The upper face of the tread is preferably grooved as at 8 and receives within it the edges of the rollers 3.

Disposed partly within the hollow door between the plates 7 and partly within the hollow space between the side plates of the wall B is a lazy-tongs composed of links 9 of the usual type, each pair of links being pivotally mounted upon a stud 10, the links being pivotally connected to each other as at 11. As illustrated, there are four pairs of links 9. The foremost links are connected at 12 to a short link 13 which in turn is connected to the forward edge of the door in any suitable manner. One of the rearmost links 9 has connected thereto a vertically disposed link 14, the other link of the pair being connected to a fixed pivot pin 10ª.

Mounted upon the inner face of the wall B is a handle lever 15 which is pivotally connected by means of a pin 16 to the link 14. This pin 16 extends through a slot 17 cut in the inner plate of the wall B. The forward end of the lever is provided with a handle and the lever moves over an arcuate rack 18 provided with suitable teeth at its upper and lower ends whereby the lever may be held in a raised position or a lowered position. The lever 15 is preferably resilient and therefore engages with the teeth of the rack upon being released by the hand of the operator.

It will be obvious now that when the lever is depressed, the lazy-tongs will be retracted as shown in dotted lines in Fig. 2 and the door 2 will be retracted into the recess or space formed between the inner and outer plates of the side wall B. When the forward end of the lever is moved upward, however, as shown in full lines in Fig. 2, the lazy-tongs will be projected, carrying with it the door and the door will be closed. In either its retracted position or its closed position the door will be locked by means of the engagement of the lever with the rack 18.

The forward edge of the door is received between the side plates of the side wall as illustrated in dotted lines in Fig. 1 and in full lines in Fig. 2. Preferably the forward and rear ends 19 and 20 of the upper edge of the door engage with springs designated 21, the springs being disposed one in the forward receiving recess of the side wall and the other within the upper end of the door casing formed by the hollow side wall. Both springs are disposed below the hand rail 22 which forms the upper end wall of the door receiving recess. These springs act to hold the door from rattling by frictionally engaging the door.

Buffers 23 of any suitable form or construction may be disposed within the forward door recess to receive the impact of the forward edge of the door when it is closed, and buffers 24 may be provided upon the rear edge of the door designed to engage with the rear end wall of the door receiving recess in the side wall when the door is opened.

From the description above given, the operation of the door will be obvious and needs no recapitulation. I have found in practice that by the use of a lazy-tongs I secure a very rapid and certain movement of the door, and further that I secure this full movement of the door from its closed or open position or vice versa by a relatively slight movement of the handle lever. This handle lever may be of any convenient form and is of course placed convenient to the hand of a rider.

It will be noted that when the door is housed within the side wall it is entirely out of the way and can not become broken or marred. There is no danger of the door swinging open as there is with a hinged door, nor is there the difficulty about closing and locking the door as there is with the ordinary hinged door. It is further pointed out that I economize space by placing the lazy-tongs partly within the hollow door and partly within the space formed within the hollow wall of the car. Thus the space within which the door need be housed is reduced to approximately the size of the door which is very necessary when it is considered that the rear door opening is separated from the front door opening by a relatively short distance. Where hinged doors are used, it is necessary for the driver to stretch out to pull the door closed and it is usually necessary to slam the door in order to make it lock securely. The door must be closed and locked before the driver can proceed without danger of accident to the door or straining its hinges. With my door it does not matter whether the door is closed or open. It is held from any accident and may be shifted at any time if the driver so desires.

What I claim is:

1. The combination with a vehicle having a hollow side wall and a door opening intersecting said wall, of a hollow door slidingly mounted in said wall for bodily movement and adapted to close said opening, a handle mounted upon the face of the wall, and a lazy-tongs operatively mounted within the hollow wall of the vehicle and extending within the hollow door and operatively connected to the forward end of the door, the other end of the lazy-tongs being operatively connected to the handle.

2. The combination with a hollow wall provided with a door opening intersecting said wall, of a hollow door slidingly mounted in said wall for bodily movement to close said opening, a handle mounted upon the face of the wall, and operative mechanism inclosed within the hollow wall and extending into and connected to the hollow door adjacent the forward edge thereof, said operative mechanism at its rear end being operatively connected to the handle.

3. The combination with a vehicle having a hollow side wall having an arcuate slot opening into the interior of the wall and a door opening intersecting said wall, of a door slidingly mounted in said wall, said door being adapted to close said opening, a handle mounted upon the interior face of the wall, a lazy-tongs composed of crossed pairs of pivotally connected links disposed within the hollow wall and connected at one end to said door, a vertically disposed link pivoted to one of the rearmost pairs of links at the other end of the lazy-tongs, a fixed pivot upon which the other of the rearmost pair is mounted, a pin projecting through the arcuate slot in the side face of the outer wall and connected to the rear end of the handle, and a locking rack over which the handle moves.

4. The combination with a vehicle having a hollow side wall and a door opening intersecting the wall, of a hollow door mounted in the wall for bodily sliding movement and adapted to close said opening, a handle disposed upon the interior face of the wall and operating in a plane parallel to the inner face of the wall, a lazy-tongs within the hollow wall, the forward end of the lazy-tongs extending into the hollow door and being connected to the forward end thereof, said lazy-tongs being formed of a plurality of pairs of pivoted links, a fixed pivot for the rear end of one of the links of the rearmost pair of links, and operative connection between said handle and the rear end of the other of said links of the rearmost pair, whereby said lazy-tongs may be actuated by the handle.

In testimony whereof I affix my signature in presence of two witnesses.

JACOB M. BOWER. [L. S.]

Witnesses:
J. D. YOAKLEY,
FREDERIC B. WRIGHT.

Copies of this patent may be obtained for five cents each, by addressing the "Commissioner of Patents, Washington, D. C."